United States Patent
Lotze et al.

(10) Patent No.: US 6,546,643 B2
(45) Date of Patent: Apr. 15, 2003

(54) ARTICULATED DEVICE FOR THE PROBE HEAD OF A COORDINATE MEASURING APPARATUS

(75) Inventors: Werner Lotze, Dresden (DE); Tobias Held, Nördlingen (DE)

(73) Assignee: Carl-Zeiss-Stiftung, Oberkochen (DE)

( * ) Notice: Subject to any disclaimer, the term of this patent is extended or adjusted under 35 U.S.C. 154(b) by 11 days.

(21) Appl. No.: 09/782,063

(22) Filed: Feb. 14, 2001

(65) Prior Publication Data

US 2001/0025427 A1 Oct. 4, 2001

(30) Foreign Application Priority Data

Feb. 15, 2000 (DE) .......................................... 100 06 753

(51) Int. Cl.⁷ ................................................ G01B 5/00
(52) U.S. Cl. .............................. 33/559; 33/556; 33/503
(58) Field of Search .......................... 33/502, 503, 556, 33/559, 561

(56) References Cited

U.S. PATENT DOCUMENTS

| 4,333,238 A | * | 6/1982 | McMurtry | 33/503 |
| 4,663,852 A | * | 5/1987 | Guarini | 33/503 |
| 4,679,332 A | * | 7/1987 | Luthi | 33/559 |
| 4,888,877 A | | 12/1989 | Enderle et al. | |
| 5,138,563 A | | 8/1992 | Debitsch et al. | |
| 5,509,211 A | * | 4/1996 | Ernst | 33/558 |
| 5,649,368 A | * | 7/1997 | Herzog et al. | 33/502 |
| 5,712,961 A | * | 1/1998 | Matsuo | 33/559 |
| 5,841,668 A | * | 11/1998 | Pahk et al. | 33/503 |
| 5,949,352 A | * | 9/1999 | Ferrari | 33/558 |
| 6,370,787 B1 | * | 4/2002 | Kikuchi | 33/503 |

FOREIGN PATENT DOCUMENTS

| DE | 40 01 433 | 7/1991 |
| EP | 0759534 | 2/1997 |

\* cited by examiner

Primary Examiner—Diego Gutierrez
Assistant Examiner—Madeline Gonzalez

(57) ABSTRACT

The invention is directed to an articulating device for a probe head (4) of a coordinate measuring apparatus with the articulating device having at least two rotation joints (14, 15) for angularly aligning the probe head (4). In this articulating device, corrective values are assigned to the device with which the errors caused by the elastic deformation of the articulating device are corrected when making measurements. To improve the measuring results, a mathematical model is used for correcting the deformation and this mathematical model includes at least one mathematical finite element (17, 18).

29 Claims, 5 Drawing Sheets

ARTICULATED DEVICE FOR THE PROBE HEAD OF A COORDINATE MEASURING APPARATUS

FIELD OF THE INVENTION

The invention relates to an articulated device for the probe head of a coordinate measuring apparatus. The articulated device includes at least two rotational joints for angularly aligning the probe head.

BACKGROUND OF THE INVENTION

Articulated devices have been known for some time. There is the so-called continuously rotatable articulated device wherein the rotational angle can be continuously adjusted via a corresponding motor and the exact rotational angle is supplied via an encoder. Also known are the latching articulated devices wherein only a limited number of rotational angles can be adjusted. In a known latching articulated device of Carl Zeiss having the product designation "RDS", two interacting crown gears of a so-called Hirth meshing are used which, in the latched state, engage in one another and thereby latch the particular adjusted rotational angle.

A continuously rotatable articulated device is disclosed in U.S. Pat. No. 4,888,877. Here, an articulated device is shown which has two motor-driven rotational joints which are continuously pivotable and the rotational axes of which are perpendicular to each other. With reference to the different rotational angles, corrective values are stored so that the probe pin need not be newly calibrated for each change of the rotational angle of the rotational joints. The corrective values define the position of the rotational axes to each other. Furthermore, alternatively or in addition, corrective values can be provided with respect to angular position deviations and the running deviations of the rotational axes. However, with respect to the realization of these last-mentioned corrections, it is not precisely described how these corrections can be advantageously utilized.

The particular feature of the articulated device shown in U.S. Pat. No. 4,888,877, is that, for each individual error, a separate correction model is required so that, on the one hand, for several corrective models, the error parameters have to be determined as well as several corrective calculations have to be carried out for the correction of the measured measurement values. In the past, this has lead to the situation that, because of the high requirements as to a short measurement time, only the position of the rotational axes to each other and the angular position deviations of the rotational joints were corrected. These corrections, however, were applicable only for continuously rotatable articulated devices such as disclosed in U.S. Pat. No. 4,888,877. The corrective models were inadequate for latching articulated devices wherein the articulated device can be latched in a plurality of different positions. It is basically desirable to further improve measurement accuracy even for continuously rotatable articulated devices.

U.S. Pat. No. 5,138,563 discloses a correction method for an articulated device wherein errors are corrected which result because of the elastic deformation of the articulated device and the probe configuration. This is especially the case when the probe configuration includes a probe head extension on which the probe head is held. For the above purpose, the method, which is described in U.S. Pat. No. 5,138,563, was expanded for correcting the position of the rotational axes by a term $\vec{B}(\alpha,\beta)$ which indicates the deformation. The articulated device with the probe configuration attached thereto was viewed like the model of a bending beam so that, for determining the term $\vec{B}(\alpha,\beta)$, the maximum through bending of the articulated device was determined and then interpolated to the corresponding through bending in dependence upon the particular angle position of the rotational joint. The model has in the past provided good service. Because of the ever increasing requirements imposed on the measuring accuracy of coordinate measuring apparatus, the attempt was undertaken in U.S. Pat. No. 5,138,563 to configure the probe head extension, which is identified by the reference numeral 5 in this publication, to be stiffer. Here, it has, however, been shown that the correction results did not, as expected, become better because the deformations, which occurred in the articulated device, had become greater than the deformations in the probe head extension and therefore the basic model of the bending beam no longer functioned.

European patent publication 0,759,534 discloses a method for correcting a continuously rotatable articulating device or latching articulating device. In this publication, it is suggested to bring the articulating device into two different rotational angles and to make a calibration at each angle. A third rotational angle lying between the rotational angles is then corrected in that an interpolation is made between the recorded calibration data. Here, nothing is explained with respect to the correction model.

SUMMARY OF THE INVENTION

It is an object of the invention to provide an articulating device with which the bending, which is caused by the probe configuration, can be corrected in an improved manner.

The articulated device of the invention is for a probe head of a coordinate measuring apparatus and includes: a first rotational joint and a second rotational joint interconnected to angularly align the probe head with errors occurring because of an elastic deformation of the articulated device; and, a correction unit using a mathematical model therein incorporating at least one mathematical finite element to correct the errors caused by the elastic deformation when making a measurement.

The basic idea of the invention is that a mathematical model is used in the correction unit provided for correcting the deformation and that this mathematical model includes at least one finite element. In this way, the special advantage is afforded that the measuring results can be more precise with this feature. Such a correction model operates even precisely when the deformations, which occur in the articulating device, are greater than the deformations in the probe head extension so that a further reduction of the measuring inaccuracy can be achieved by the use of stiff probe head extensions.

The correction unit is a computer or microprocessor wherein the recorded corrective values are stored and which corrects the measured measurement values in correspondence to the selected mathematical model.

A mathematical finite element can be provided basically at any desired location and with a desired alignment in the articulating device. For reasons of computation, it is recommended that the finite element(s) be allocated to the rotational axes of the rotational joint and especially in such a manner that the elastic center of the finite element lies on a rotational axis of the joint.

The model should be so selected that the finite element can be mathematically displaced along the assigned axis in order to determine the location at which the best corrective results are obtained. In this way, it becomes also possible that errors can be considered, which are caused by a horizontally outwardly extending measuring arm of a stand-type measuring apparatus and by the connection of the articulating device to the measuring arm, in that the finite element can be mathematically displaced correspondingly in the direction toward the measuring arm.

A further simplification with respect to computation results when the finite element permits, as degrees of freedom, only rotations about the three axes of the coordinate system corresponding thereto.

Especially good results are obtained when an inherent finite element is assigned to each rotational axis.

It is here noted that the correction method can be used for latching articulating devices as well as for continuously rotatable articulating devices.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
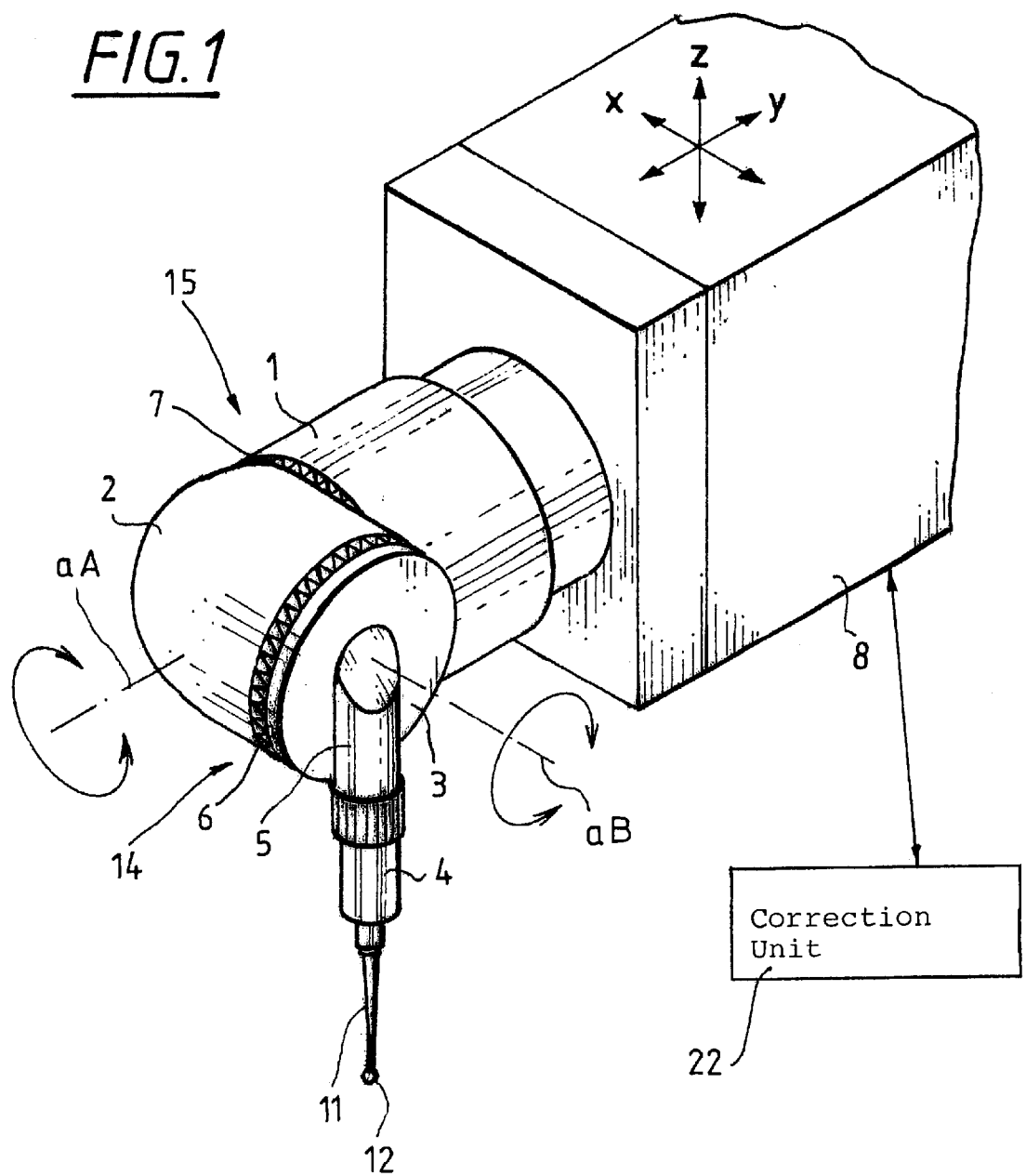
FIG. 1 is a perspective view of an articulating device for a probe head of a coordinate measuring apparatus.

FIG. 1 shows an articulating device which is here configured as a so-called latching articulating device. The articulating device is attached to a horizontally aligned measuring arm 8 of a stand-type measuring apparatus and has two rotational joints (14, 15) which connect the components 1 and 2 as well as the components 2 and 3 rotatably with each other. The rotational joints (15, 14) define the rotational axes $a_A$ and $a_B$. The articulating device includes so-called Hirth gears (6, 7) for tightly latching the adjusted rotational angles. These gearings are pairs of interacting bevel gears which mesh with each other. A pneumatic cylinder is disposed in the interior of the articulating device in order to change the rotational angles of the rotational joints (14, 15). The component 2 can be lifted relative to the component 1 as well as the component 3 relative to the component 2 via the pneumatic cylinder. An electric motor is provided for each of the rotational joints via which the rotational angle of the particular rotational joint (14, 15) can be adjusted. After the desired rotational angle is reached, the lifted components 1 and 2 or 2 and 3 are again pulled together by the pneumatic device.

In FIG. 1, a probe head 4 of the switching type is mounted in the receptacle of the articulating device. A probe pin 11 is, in turn, held on the probe head 4. The probe pin 11 with a probe ball 12 is held so that it can be exchanged. An electrical signal is triggered by the probe head 4 when the probe ball 12 comes into contact with a workpiece. It is understood that an optical probe head or a measuring probe head can also be used. The probe head 4 is attached to the holder plate 3 by means of an adapter 5.

The measurement values are recorded by the coordinate measuring apparatus during a measurement and are corrected in the correction unit 22 in accordance with a mathematical model. The correction unit 22 is shown here only schematically and is usually the computer of the coordinate measuring apparatus. A microprocessor of the correction unit itself can be alternatively used and can be arranged, for example, in the control of the coordinate measuring apparatus or even in the articulating device itself.

I. Basic Model

For each rotational angle, the precise spatial vector $\vec{x}$ of the center point P of the probe ball 12 has to be known in order to carry out measurements with such an articulating device having different rotational angles of the rotational joints (14, 15). The spatial vector $\vec{x}$ is referred to the apparatus coordinate system ($X_G$, $Y_G$, $Z_G$) This subject matter will be explained with respect to FIG. 2.

Figure 2:
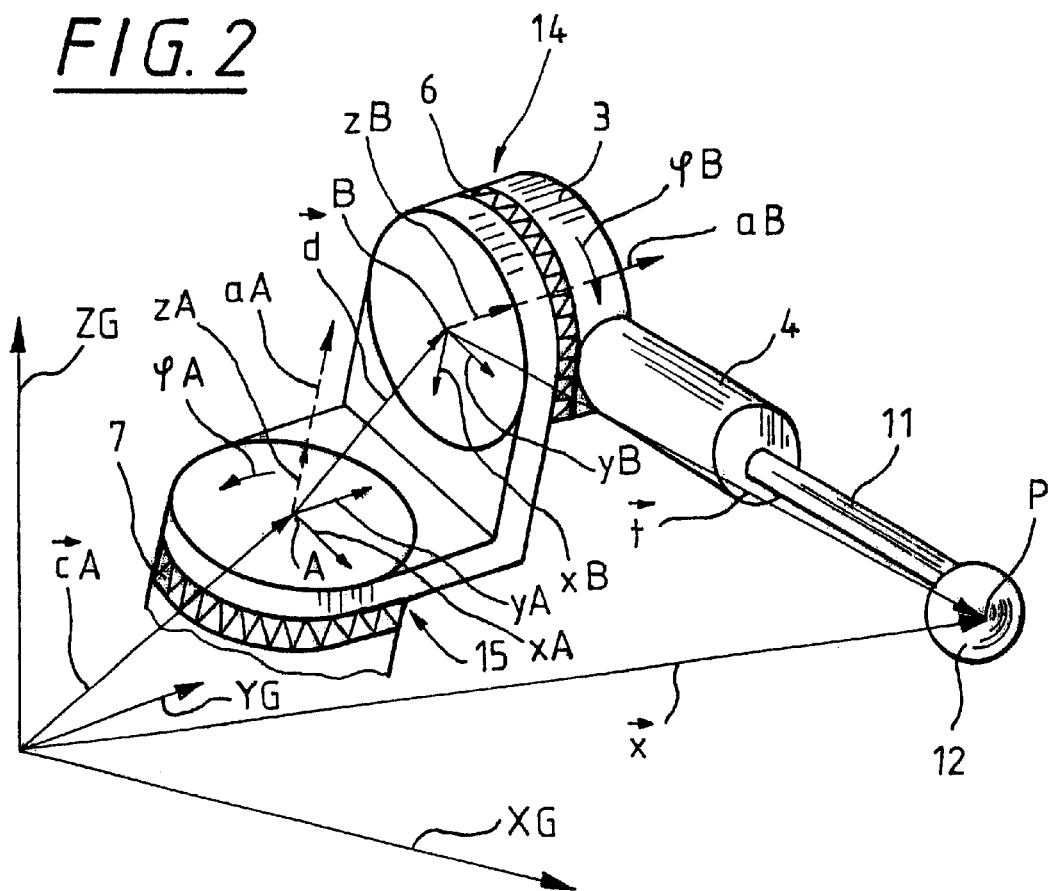
FIG. 2 is a schematic of the articulating device of FIG. 1.

FIG. 2 is a schematic representation of the articulating device of FIG. 1 wherein the same reference numerals as in FIG. 1 are used for the same components.

The above spatial vector $\vec{x}$ of the probe ball 12 in the apparatus coordinate system ($X_G$, $Y_G$, $Z_G$) can be given as a vector equation as follows:

$$\vec{x} = T_A^{-1} R_A (T_B^{-1} R_B \vec{t} + \vec{d}) + \vec{c}_A \qquad \text{Equation 1}$$

The points A and B are the intersect points of a line with the rotational axes $a_A$ and $a_B$. The straight line runs along the shortest distance of the two rotational axes $a_A$ and $a_B$. The vector $\vec{x}$ means here the spatial vector of the center point P of the probe ball 12 referred to the apparatus coordinate system ($X_G$, $Y_G$, $Z_G$) The vector $\vec{t}$ is the vector from point B to the center point P of the probe ball 12. The vector $\vec{c}_A$ is the spatial vector of the point A referred to the apparatus coordinate system ($X_G$, $Y_G$, $Z_G$). The vector $\vec{d}$ is the distance vector of the point B from point A. The rotation matrix $R_A$ describes the rotation of the rotational joint 15 about the rotational axis $a_A$. The rotational matrix $R_B$ describes the rotation of the rotational joint 14 about the axis $a_B$. The transformation matrix $T_A$ defines the transformation of the apparatus coordinate system ($X_G$, $Y_G$, $Z_G$) into the joint coordinate system ($X_A$, $Y_A$, $Z_A$) at point A. The transformation matrix $T_B$ defines the transformation of the joint coordinate system $(X_A, Y_A, Z_A)$ at point A into the joint coordinate system $(X_B, Y_B, Z_B)$ at point B.

The equation 1 corresponds to the equation described in U.S. Pat. No. 4,888,877 incorporated herein by reference and is only mathematically described somewhat differently.

In the ideal error-free rotational joint, the movement thereof is a pure rotation and the rotation matrices $R_A$ and $R_B$ apply for the rotation about the Z axis of the respective joint coordinate systems $(X_A, Y_A, Z_A)$ and $(X_B, Y_B, Z_B)$.

$$R_A = R_B = \begin{pmatrix} \cos\varphi & -\sin\varphi & 0 \\ \sin\varphi & \cos\varphi & 0 \\ 0 & 0 & 1 \end{pmatrix} \quad \text{Equation 2}$$

In this equation too, $\phi$ is the rotational angle about the particular rotational joint (14, 15). For the rotational matrix $R_A$, it is the rotational angle $\phi_A$ of the rotational joint 15 and for the rotational matrix $R_B$ it is the rotational angle $\phi_B$ Of the rotational joint 14.

All other vectors and matrices are unknown also in the case of the ideal rotational joint and have to be determined experimentally, namely, nine components of vectors as well as six spatial angles of the transformation matrices. In addition, further unknowns are the zero angles of both angle measurement systems. Accordingly, measurements for at least 17 independent condition equations have to be carried out for the calibration of the articulating unit. This is also the case when the correction of the individual rotational joints is known.

II. Kinematic Correction

Figure 3:
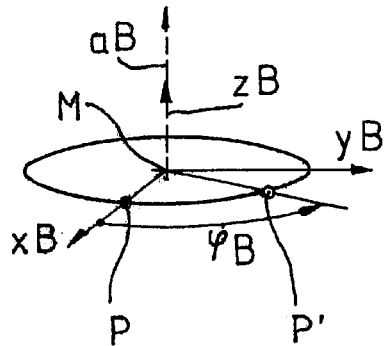
FIG. 3 shows the rotation of the center point P of the probe ball about an ideal rotational joint without running deviations.

In the zero approximation, the rotational joint has only a single kinematic degree of freedom which can be described with the rotational matrix of equation 2 as a pure rotation about the rotational axis as is shown by a way of example in FIG. 3 for the rotation about the axis $a_B$. As shown here, in this case, the probe ball center point P is, for a rotation about an angle $\phi_B$ about the rotational axis $a_B$, so imaged on a point P' that both points lie on a circle whose plane is perpendicular to the particular rotational axis and whose center point M lies on the rotational axis $a_B$.

Figure 4:
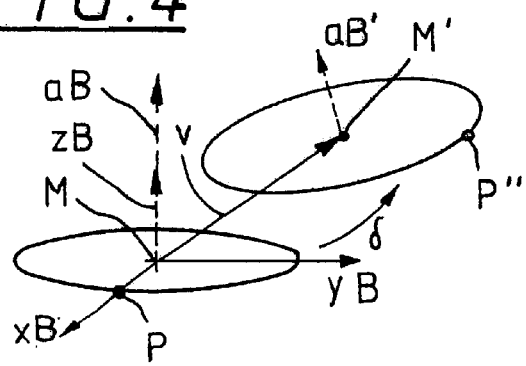
FIG. 4 shows the rotation of the center point of the probe ball about a real rotational joint having running deviations.
Figure 5:
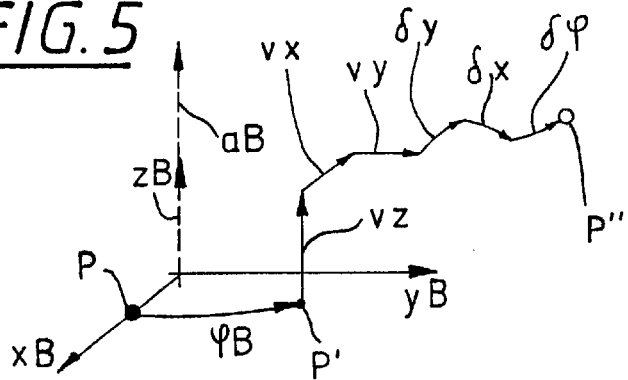
FIG. 5 is a schematic of the errors in the rotation of the center point of the probe ball about a real rotational joint with running deviations.

In contrast, a real rotation joint has movements in all six degrees of freedom caused by the manufacturing inaccuracies as can be seen in the schematic of FIG. 4. As shown in FIG. 4, the probe ball center point P is now imaged on a point P'' for a rotation about the rotational axis $a_B$. The point P'' does not lie on the circle about the rotational axis $a_B$. The six degrees of freedom in which the movements can take place simultaneously correspond to the six error components which have to be added to the theoretical point P' in order to reach the actual point P'' as seen in FIG. 5. These error components are:

a) angle position deviations $\delta\phi = \delta_z$ of the latch system or angular measuring system;
b) radial running deviations $(v_x, v_y)$ in the x and y directions;
c) axial displacements $v_z$; and,
d) tilt movements of $\delta_x, \delta_y$ about the x and y axes, respectively, as wobble errors.

In lieu of the rotational movement, the guided part goes through a general rigid body movement in space which comprises the displacement vector $\vec{v}$ and the vector $\vec{\delta}$ of the spatial rotations.

Correspondingly, and referred to the articulating device of FIG. 2, the spatial displacement of the center point P of the probe ball 12 for one rotation about one of the two rotation joints (14 or 15) from P to P'', comprises seven components, that is, the one nominal rotation about the rotation angle ($\phi_A$ or $\phi_B$) plus the six error components corresponding to respective ones of the rotations, that is, three displacements $(v_x, v_y, v_z)$ and three rotations $(\delta x, \delta y, \delta\phi)$ each.

In view of the foregoing, the above-mentioned base model can be expanded as follows:

$$\vec{x} = T_A^{-1} R_A \left( D_A \left( T_B^{-1} R_B \left( D_B \vec{i} + \vec{v}_B \right) + \vec{d} \right) + \vec{v}_A \right) + \vec{c}_A \quad \text{Equation 3}$$

The components, which are expanded compared to the base model of Equation 1, have the following significance. The vector $\vec{v}_A$ means the displacement error which arises because of rotation joint 15. The rotational matrix $D_A$ represents the rotational error which occurs about the rotational joint 15. The vector $\vec{v}_B$ means the displacement error which is caused by the rotational joint 14. The matrix $D_B$ represents the rotational error which arises about the rotational joint 14.

The vectors $\vec{v}_A$ and $\vec{v}_B$ which are each put together from the displacement errors in the x, y and z direction are defined as follows:

$$\vec{v}_A = \vec{v}_B \begin{pmatrix} v_x \\ v_y \\ v_z \end{pmatrix} \quad \text{Equation 4}$$

The spatial rotational matrices $D_A$ and $D_B$, which are each compiled from the individual rotations $D_x$, $D_y$ and $D_z$ about the coordinate axes x, y and z with the Euler angles $\delta_x$, $\delta_y$, $\delta_z$, result as follows:

$$D_A = D_B = \begin{pmatrix} 1 & 0 & 0 \\ 0 & \cos\delta_x & \cos\delta_x \\ 0 & -\cos\delta_x & \cos\delta_x \end{pmatrix} \quad \text{Equation 5}$$

$$\begin{pmatrix} \cos\delta_y & 0 & -\cos\delta_y \\ 0 & 1 & 0 \\ \sin\delta_y & 0 & \cos\delta_y \end{pmatrix} \begin{pmatrix} \cos\delta_z & \sin\delta_z & 0 \\ -\sin\delta_z & \cos\delta_x & 0 \\ 0 & 0 & 1 \end{pmatrix}$$

Figure 6:
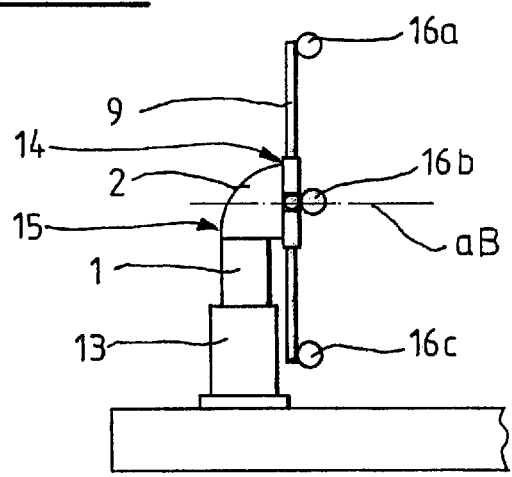
FIG. 6 shows a measuring assembly with which the correction parameters for the running deviations of the rotational joint can be determined.
Figure 7:
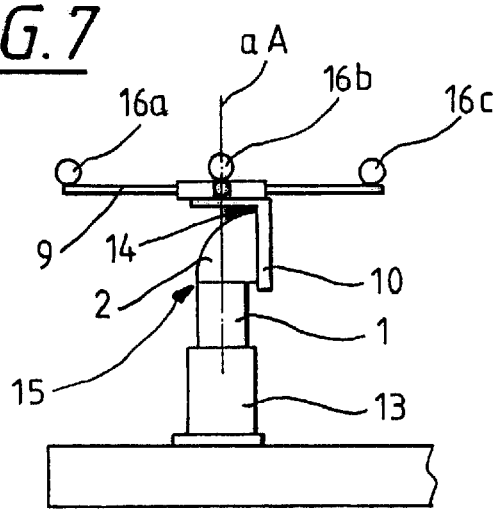
FIG. 7 shows a measuring assembly with which the correction parameters can be determined for the running deviations of the rotational joint.

The determination of the vector $\vec{v}_B$ for the displacement errors at the rotation joint 14 as well as the rotation matrix $D_B$ for the rotation errors of the rotation joint 14 can take place in a relatively simple manner as is explained in connection with FIG. 6. For this purpose, the articulating device is mounted on a high precision coordinate measuring apparatus and a ball test body 9 is mounted on the articulating device which has at least three balls (16a, 16b, 16c). Now the rotation joint 14 is brought into each of its possible rotation angles and the particular position of the balls (16a, 16b, 16c) is measured with a centering probe which is configured in a manner of a thimble. It has been shown that the errors are only then sufficiently small when measurement is made with an adequate measuring force. However, this leads to a relatively large bending of the ball test body 9. For this reason, it can be especially advantageous to determine the exact position of the balls (16a, 16b, 16c) in that measuring is done with two different measuring forces and to then extrapolate to the position which the balls have for the measuring force 0 N. For each rotation angle of the rotation joint 14, a plane is drawn from the position of the balls (16a, 16b, 16c) and the surface centroid is determined from the measured ball positions. The vector $\vec{v}_B$ for the shift errors results as vector from the centroid in the reference rotational angle of the articulating device to the centroid in the actual rotation angle. The error angles for the rotation matrix $D_B$ result from the twisting of the computed plane in the reference rotation angle to the computed plane in the actual rotation position.

In the same manner, the vector $\vec{v}_A$ is determined for the shift errors in the rotation joint 15 as well as the rotation matrix $D_A$ for the rotation errors of the rotation joint 15. The ball test body 9 is fixed via an angle piece 10 to the articulating device.

3. Correction of Elastic Bending Error

Figure 8:
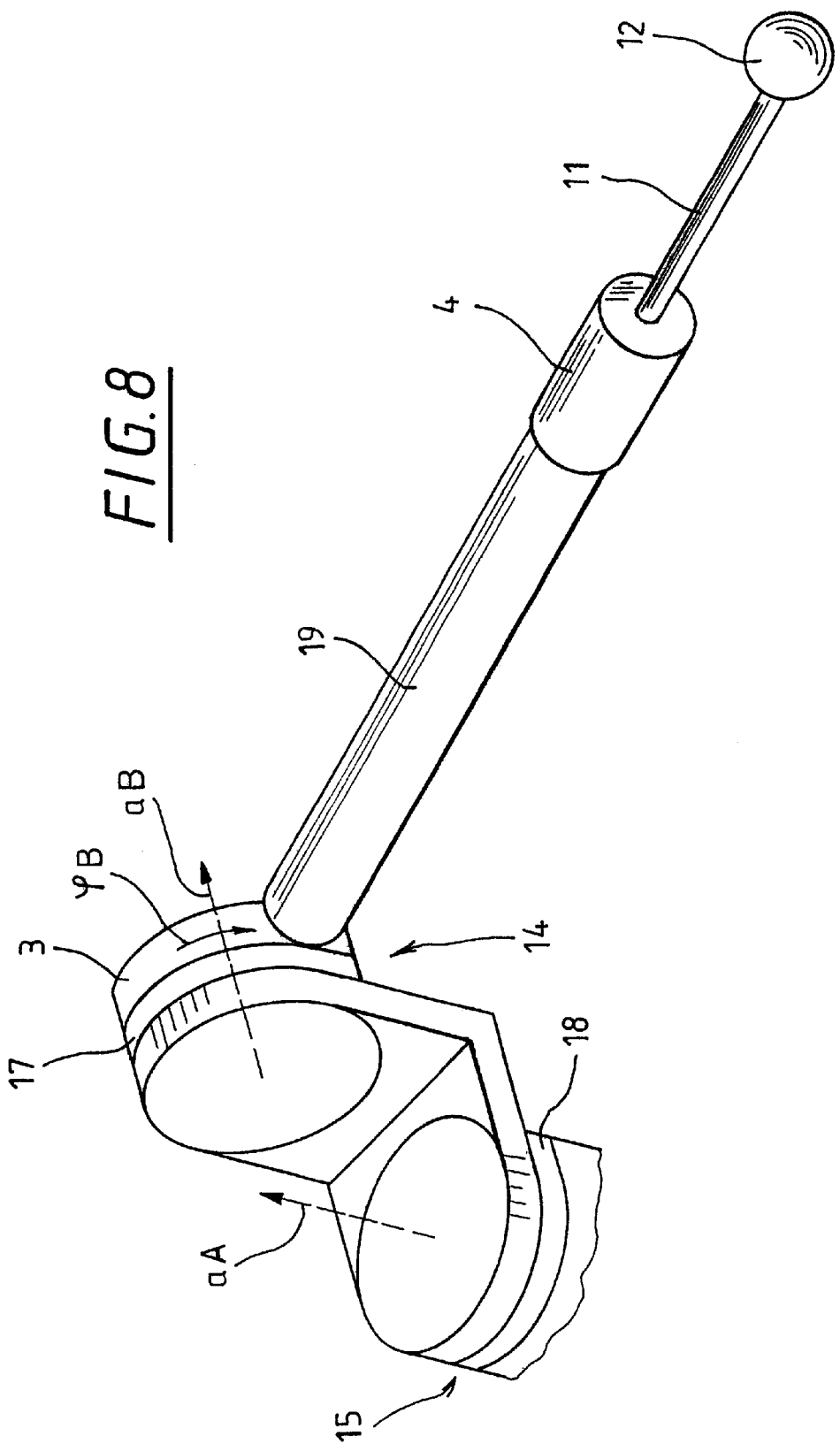
FIG. 8 shows a schematic of the articulating device of FIG. 1 wherein the probe configuration includes a probe head extension and wherein two finite elastic elements have been inserted for computing the elastic deformation.

Under real conditions, deformations of the articulating device as well as of the probe configuration thereof (see FIG. 8) occur because of the weight forces, especially of the probe configuration, that is, of the probe head 4, the probe pin 11 as well as especially the probe head extensions 19.

According to the invention, finite elastic elements are introduced for the computation of this elastic deformation. These finite elements are mathematical finite elements in accordance with the finite element method. The deformation of elastic systems under external static loading can be described with these mathematical finite elastic elements. In this way, and on this basis, realistic analytic model equations for the correction of the deformation can be derived whose coefficients can be determined by means of best fit computations from a plurality of positions as well as deformation and loading conditions. The substitute model will be explained with respect to FIGS. 8 to 10. As can be seen from the schematic of FIG. 8, the finite elements 17 and 18 are placed at the positions in this especially advantageous configuration at which the components 1 and 2 or 2 and 3 are in contact with each other, that is, at the position at which the Hirth meshings (6, 7) are seated (see FIGS. 1 and 2). The components 1 and 2 or 2 and 3 are rotatably connected to each other. These finite elements (17, 18) can be presented simplified as rubber discs which connect parts 1 and 2 or 2 and 3 elastically to each other.

The model proceeds from the assumption that the deformation can be described as spatial shifting and rotation between the components 1 and 2 referred to the rotation joint 15 with the components 1 and 2 being connected in the manner of a joint to each other and the components 2 and 3 with respect to the rotation joint 14; whereas, the other components such as the components 1, 2 and 3 of the articulating device, the probe pin 11, the probe head 4 and the probe head extension 19 can be assumed to be completely rigid. The total error can then be computed from a superposition of the corrections of the rigid model (as described above in Equation 1 or Equation 3) and the correction of the elastic bending errors as here described. The deformation corrective vector is that vector by which the joint 15 deforms and is defined as $\vec{u}_A$ and the deformation corrective vector about the joint 14 deforms is defined as $\vec{u}_B$. With these vectors so defined, the combination with Equation 3 yields the following equation:

$$\vec{x} = T_A^{-1} R_A \left( D_A \left( T_B^{-1} R_B \left( D_B \vec{t} + \vec{v}_B \right) + \vec{d} \right) + \vec{v}_A \right) + \vec{c}_A + \vec{u}_A + \vec{u}_B \quad \text{Equation 6}$$

It is understood that Equation 6 is especially advantageous because, in addition to the deformation, also angle deviations, radial movements, axial displacements and wobble movements of the rotation joints 14 and 15 are corrected as described above. The deformation corrective vectors $\vec{u}_A$ and $\vec{u}_B$ can just as well be combined with Equation 1, for example, when a continuously rotatable articulating device is used whose rotation joints have only slight errors of the above-described type. In the same manner, the deformation corrective vectors $\vec{u}_A$ and $\vec{u}_B$ can also be computed completely separately.

Figure 9:
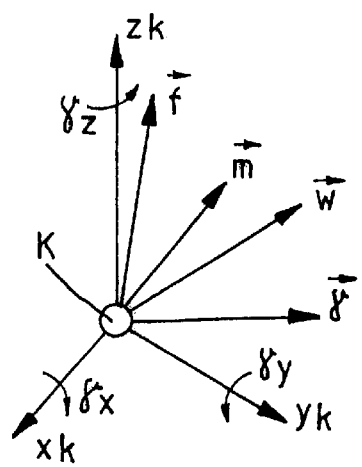
FIG. 9 shows a schematic of an elastic center K of a finite element.

As shown in FIG. 9, in this way, a finite element can be so mathematically treated as though only a force vector $\vec{f}$ and a torque vector $\vec{m}$ would act at the center K of such a finite element 17 or 18. The force vector $\vec{f}$ and the torque vector $\vec{m}$ are generated by the external loading, that is, the weight forces of the probe configuration and, if required, by the measuring forces. This model has as a condition precedent that the elastic center K of the finite element with its position and its orientation in space as well as with its elastic parameters has the elastic characteristics of the deformed component. Furthermore, the deformation has to be linearly dependent upon the loading and proportional to the forces and torques acting in the elastic center K. Furthermore, the superposition principle must apply. The finite element reacts to the force vector $\vec{f}$ and the torque vector $\vec{m}$ with a deformation corrective vector $\vec{u}$ which can be put together from a translation vector $\vec{w}$ and a rotational vector $\vec{\gamma}$. The deformation corrective vector $\vec{u}$ can be determined as follows:

$$\vec{u} = \begin{pmatrix} \vec{w} \\ \vec{g} \end{pmatrix} = N * \vec{b} = \begin{pmatrix} N_{11} & N_{12} \\ N_{21} & N_{22} \end{pmatrix} \begin{pmatrix} \vec{f} \\ \vec{m} \end{pmatrix} \quad \text{Equation 7}$$

N is the yielding matrix which, as hypermatrix, contains the yielding matrices $N_{11}$ to $N_{22}$. This means the following for the translation vector $\vec{w}$ and the rotation vector $\vec{\gamma}$:

$$\vec{w} = N_{11} \vec{f} + N_{12} \vec{m} \quad \text{Equation 8}$$

$$\vec{g} = N_{21} \vec{f} + N_{22} \vec{m} \quad \text{Equation 9}$$

In this equation, the yielding matrices $N_{11}$ to $N_{22}$ mean the following:

$N_{11}$=translation as a consequence of the force vector $\vec{f}$ operating at the elastic center K;

$N_{12}$=translation as a consequence of the torque vector $\vec{m}$ operating in the elastic center K;

$N_{21}$=rotation as a consequence of the force vector $\vec{f}$ operating in the elastic center K; and, $N_{22}$=rotation as a consequence of the torque vector $\vec{m}$ operating in the elastic center K.

Figure 10:
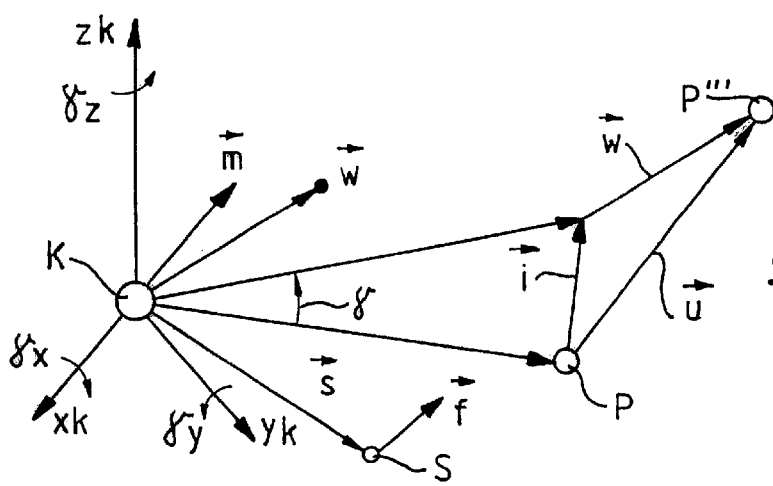
FIG. 10 likewise shows a schematic of the elastic center K of a finite element with the displacement of the center point P of the probe ball; and, FIG. 11 shows the articulating device of FIG. 1 from the front with a star probe.

The yielding matrix is defined in the coordinates ($x_K$, $y_K$, $z_K$) of the elastic center K and has to be transformed into the actual apparatus coordinate system ($X_G$, $Y_G$, $Z_G$) As shown schematically in FIG. 10, as an external load, the inherent weight of the probe configuration (such as the probe head 4) operates on the actual system according to the equation $\vec{f} = m^* \vec{g}$ at the center of gravity S. The inherent weight, therefore, effects the torque vector $\vec{m}$ from the force vector $\vec{f}$ and the distance vector $\vec{s}$ between the elastic center K and the center of gravity S in accordance with:

$$\vec{m} = \vec{f} \times \vec{s} \qquad \text{Equation 10}$$

The deformation vector $\vec{u}$ by which the center point P of the probe ball 12 is displaced because of the deformation results then from the superposition of spatial displacement in accordance with the translation vector $\vec{w}$ and the rotation in accordance with the rotation vector $\vec{\gamma}$ as follows:

$$\vec{u} = \vec{w} + \vec{g} \times \vec{p}$$
$$= N_{11}\vec{f} + N_{12}(\vec{f} + \vec{s}) + (N_{21}\vec{f} + N_{22}(\vec{f} \times \vec{s})) \times \vec{p} \qquad \text{Equation 11}$$

wherein the vector $\vec{p}$ is the distance vector between the elastic center K and the center point P of the probe ball 12. FIG. 10 shows this clearly. Here, the vector $\vec{\gamma} \times \vec{p}$ is shown as vector $\vec{i}$.

If one selects the coordinate system so that the force vector $\vec{f}$ alone causes a translation at the elastic center K and the torque vector $\vec{f}$ alone causes a rotation in the elastic center K, then the lower matrices $N_{12}$ and $N_{21}$ can be substituted by zero matrices. The translation vector $\vec{w}$ and therefore also the yielding matrix $N_{11}$ can be considered negligible for large lengths of the distance vector $\vec{p}$ and therefore also the distance vector $\vec{s}$ and the high translatory stiffness of the elastic substitute element. For a corresponding selection of the coordinate system $(X_K, Y_K, Z_K)$ of the finite elastic elements, the coefficients outside of the primary diagonals of the yielding matrices $N_{ij}$ become zero. With this simplification, the following equation applies:

$$\vec{u} \approx \vec{g} \times \vec{p} = (N_{22}(\vec{f} \times \vec{s})) \times \vec{p} \qquad \text{Equation 12}$$

The original 36 coefficients of the hypermatrix N have therefore been reduced to three rotary yielding coefficients and the remaining matrix is:

$$N_{22} = N_\phi = \begin{pmatrix} \Phi_1 & 0 & 0 \\ 0 & \Phi_2 & 0 \\ 0 & 0 & \Phi_3 \end{pmatrix} \qquad \text{Equation 13}$$

In this matrix $N_{22}$, $(\Phi_1, \Phi_2)$ mean the yielding for the tilting about the x and y axes $(X_K, Y_K)$ of the coordinate system of the finite elements and $\Phi_3$ is the rotation about the z axis $Z_K$.

The deformation corrective vectors $\vec{u}_A$ and $\vec{u}_B$ are computed separately for each of the finite elements (17, 18) in accordance with Equation 12. As mentioned initially herein, the selection of the number of finite elements (17, 18) as well as their positions are here referred to the articulating device shown and are especially advantageous. In principle, the number as well as the position of the finite elements are freely selectable. For example, a single finite element is sufficient. Also, the position is variable. Should, for example, the elastic deformation of the horizontally directed measuring arm of a stand measuring apparatus and/or the connection of the articulating device to the measuring arm be detected, then the finite element 18 should be mathematically displaced in the direction toward the measuring arm.

At least eight calibrations in different rotational positions of the rotational joints 14 and 15 have to be undertaken on the calibration normal of the coordinate measuring apparatus in order (for a new probe configuration mounted on the articulating device) to determine the parameters of the yielding matrix $N_{22}$ for the joint 14 as well as for the joint 15 and to determine the vector $\vec{t}$ from the center point P of the probe ball 12 to the point B. However, during regular measurements, the probe configuration, for example, the probe pin or the probe head extension are exchanged frequently. If the same probe configuration is again used at a later point in time, then the above-mentioned parameters must be determined anew which is relatively time intensive. If one assumes that, for a renewed exchange of one and the same probe configuration, the elastic characteristics of the probe configuration and the parameters of the yielding matrix ($N_{22}$) remain almost unchanged, then it is sufficient in this case to determine only the vector $\vec{t}$ so that, in principle, only a single calibration on the calibration normal would be sufficient.

Figure 11:
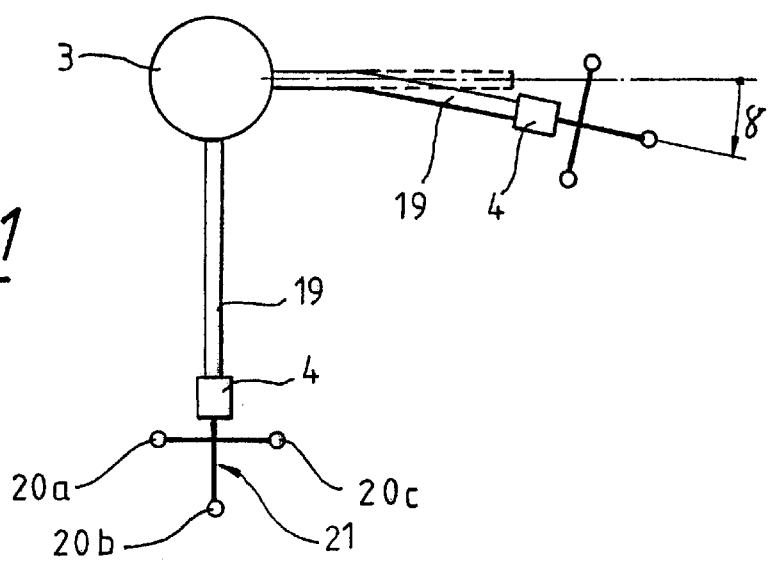

This method can be advantageously used in the calibration of star probe pins. FIG. 11 shows this in a schematic wherein only the component 3 from the articulating device of FIG. 1 is shown onto which a probe head extension 19 having probe head 4 and star probe pin 21 is connected. If one assumes that approximately the same bending parameters are present with respect to all probe balls (20a, 20b, 20c) of the star probe pin 21, then it is sufficient to determine the parameters of the yielding matrix $N_{22}$ only for one of the probe balls (20a, 20b, 20c). For the other probe balls (20a, 20b, 20c), only the vector $\vec{t}$ has to be determined.

It is understood that the foregoing description is that of the preferred embodiments of the invention and that various changes and modifications may be made thereto without departing from the spirit and scope of the invention as defined in the appended claims.

What is claimed is:

1. An articulated device for a probe head of a coordinate measuring apparatus, the articulated device comprising:
   a first rotational joint and a second rotational joint interconnected to angularly align said probe head with errors occurring because of an elastic deformation of said articulated device; and,
   a correction unit using a mathematical model therein incorporating at least one mathematical finite element to correct said errors caused by said elastic deformation when making a measurement.

2. The articulated device of claim 1, said first and second rotational joints defining respective rotational axes ($a_A$, $a_B$); and, said at least one mathematical finite element being mathematically located to one of said axes ($a_A$, $a_B$).

3. The articulated device of claim 2, wherein said mathematical finite element has an elastic center (K); and, said elastic center (K) lies mathematically on said one of said axes ($a_A$, $a_B$).

4. The articulated device of claim 3, wherein said finite element is mathematically displaceable along said rotational axis.

5. The articulated device of claim 4, wherein said finite element has a coordinate system ($x_k$, $y_k$, $z_K$) assigned thereto; and, said mathematical finite element having a degree of freedom restricted to a rotation about the three axes of said coordinate system ($x_K$, $y_K$, $z_K$).

6. The articulated device of claim 3, wherein said elastic deformation is corrected with a deformation correction vector ($\vec{u}$) in said mathematical model; and, said deformation correction vector ($\vec{u}$) includes the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, $\vec{p}$ is the distance vector between said elastic center (K) and the probe ball center point (P).

7. The articulated device of claim 6, wherein said correction unit utilizes the deformation parameter ($N_{22}$) of a previously made calibration in the calibration of a probe configuration.

8. The articulated device of claim 3, wherein said finite element has a coordinate system ($x_K$, $y_K$, $z_K$) assigned thereto; and, said mathematical finite element having a degree of freedom restricted to a rotation about the three axes of said coordinate system ($x_K$, $y_K$, $z_K$).

9. The articulated device of claim 2, wherein said finite element has a coordinate system ($x_K$, $y_K$, $z_K$) assigned thereto; and, said mathematical finite element having a degree of freedom restricted to a rotation about the three axes of said coordinate system ($x_K$, $y_K$, $z_K$).

10. The articulated device of claim 2, wherein said elastic deformation is corrected with a deformation correction vector ($\vec{u}$) in said mathematical model; and, said deformation correction vector ($\vec{u}$) includes the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, $\vec{p}$ is the distance vector between said elastic center (K) and the probe ball center point (P).

11. The articulated device of claim 1, wherein said at least one mathematical finite element is a first mathematical finite element; and, said articulated device further comprising a second mathematical finite element in the region of said first and second rotational joints.

12. The articulated device of claim 1, wherein errors introduced by a measuring arm of said coordinate measuring apparatus and/or by the connection of said articulating device to said measuring arm are also considered in said mathematical model.

13. The articulated device of claim 1, wherein said finite element has a coordinate system ($x_K$, $y_K$, $z_K$) assigned thereto; and, said mathematical finite element having a degree of freedom restricted to a rotation about the three axes of said coordinate system ($x_K$, $y_K$, $z_K$).

14. The articulated device of claim 1, wherein said elastic deformation is corrected with a deformation correction vector ($\vec{u}$) in said mathematical model; and, said deformation correction vector ($\vec{u}$) includes the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, p1 $\vec{p}$ is the distance vector between said elastic center (K) and the probe ball center point (P).

15. An articulated device for a probe head of a coordinate measuring apparatus, the articulated device comprising:

a first rotational joint and a second rotational joint interconnected to angularly align said probe head with errors occurring because of an elastic deformation of said articulated device;

a correction unit using a mathematical model therein incorporating at least one mathematical finite element to correct said errors caused by said elastic deformation when making a measurement;

said first and second rotational joints defining respective rotational axes ($a_A$, $a_B$); and, said at least one mathematical finite element being mathematically located to one of said axes ($a_A$, $a_B$).

16. The articulated device of claim 15, wherein said mathematical finite element has an elastic center (K); and, said elastic center (K) lies mathematically on said one of said axes ($a_A$, $a_B$).

17. The articulated device of claim 15, wherein said finite element is mathematically displaceable along said rotational axis.

18. The articulated device of claim 15, wherein said finite element has a coordinate system ($x_K$, $y_K$, $z_K$) assigned thereto; and, said mathematical finite element having a degree of freedom restricted to a rotation about the three axes of said coordinate system ($x_K$, $y_K$, $z_K$).

19. The articulated device of claim 15, wherein said at least one mathematical finite element is a first mathematical finite element; and, said articulated device further comprising a second mathematical finite element in the region of said first and second rotational joints.

20. The articulated device of claim 15, wherein errors introduced by a measuring arm of said coordinate measuring apparatus and/or by the connection of said articulating device to said measuring arm are also considered in said mathematical model.

21. The articulated device of claim 15, wherein said elastic deformation is corrected with a deformation correction vector ($\vec{u}$) in said mathematical model; and, said deformation correction vector ($\vec{u}$) includes the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, $\vec{p}$ is the distance vector between said elastic center (K) and the probe ball center point (P).

22. The articulated device of claim 21, wherein said correction unit utilizes the deformation parameter ($N_{22}$) of a previously made calibration in the calibration of a probe configuration.

23. An articulated device for a probe head of a coordinate measuring apparatus, the articulated device comprising:

a first rotational joint and a second rotational joint interconnected to angularly align said probe head with errors occurring because of an elastic deformation of said articulated device;

a correction unit using a mathematical model therein incorporating at least one mathematical finite element to correct said errors caused by said elastic deformation when making a measurement;

said finite element has a coordinate system ($x_K$, $y_K$, $z_K$) assigned thereto; and, said mathematical finite element having a degree of freedom restricted to a rotation about the three axes of said coordinate system ($x_K$, $y_K$, $z_K$).

24. The articulated device of claim 23, wherein said at least one mathematical finite element is a first mathematical finite element; and, said articulated device further comprising a second mathematical finite element in the region of said first and second rotational joints.

25. The articulated device of claim 23, wherein errors introduced by a measuring arm of said coordinate measuring apparatus and/or by the connection of said articulating device to said measuring arm are also considered in said mathematical model.

26. The articulated device of claim 23, wherein said elastic deformation is corrected with a deformation correction vector ($\vec{u}$) in said mathematical model; and, said deformation correction vector ($\vec{u}$) includes the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, $\vec{p}$ is the distance vector between said elastic center (K) and the probe ball center point (P).

27. The articulated device of claim 26, wherein said correction unit utilizes the deformation parameter ($N_{22}$) of a previously made calibration in the calibration of a probe configuration.

28. An articulated device for a probe head of a coordinate measuring apparatus, the articulated device comprising:

a first rotational joint and a second rotational joint interconnected to angularly align said probe head with errors occurring because of an elastic deformation of said articulated device;

a correction unit using a mathematical model therein incorporating at least one mathematical finite element to correct said errors caused by said elastic deformation when making a measurement;

said elastic deformation being corrected with a deformation correction vector ($\vec{u}$) in said mathematical model; and, said deformation correction vector ($\vec{u}$) including the following subcomponents:

$$\vec{u} = (N_{22}(\vec{f} \times \vec{s})) \times \vec{p}$$

wherein:

$\vec{f}$ is the weight force vector acting at the center of gravity;

$\vec{s}$ is the distance vector between said center of gravity (S) and said elastic center (K) of said at least one mathematical finite element;

$N_{22}$ is the yielding matrix for the rotation as a consequence of the torque vector ($\vec{m} = \vec{f} \times \vec{s}$) acting at said elastic center (K); and, $\vec{p}$ is the distance vector between said elastic center (K) and the probe ball center point (P).

29. The articulated device of claim 28, wherein said correction unit utilizes the deformation parameter ($N_{22}$) of a previously made calibration in the calibration of a probe configuration.

* * * * *

UNITED STATES PATENT AND TRADEMARK OFFICE
CERTIFICATE OF CORRECTION

PATENT NO. : 6,546,643 B2
DATED : April 15, 2003
INVENTOR(S) : Werner Lotze and Tobias Held It is certified that error appears in the above-identified patent and that said Letters Patent is hereby corrected as shown below:

Title page,
Item [73], Assignee, delete "Oberkochen" and substitute -- Heidenheim-Brenz -- therefor.
Before Item [57], ABSTRACT, add -- [74] *Attorney*– Walter Ottesen -- therefor.

Column 4,
Line 36, delete "($X_G$, $Y_G$, $Z_G$)" and substitute -- ($X_G$, $Y_G$, $Z_G$). -- therefor.

Column 5,
Line 19, delete "Of" and substitute -- of -- therefor.
Line 36, delete "a way" and substitute -- way -- therefor.

Column 6,
Line 35, delete "$\delta_z$" and substitute -- $\delta_x$' -- therefor.
Lines 36 to 45, delete "
$$D_A = D_B = \begin{pmatrix} 1 & 0 & 0 \\ 0 & \cos\delta_x & \cos\delta_x \\ 0 & -\cos\delta_x & \cos\delta_x \end{pmatrix} \begin{pmatrix} \cos\delta_y & 0 & -\cos\delta_y \\ 0 & 1 & 0 \\ \sin\delta_y & 0 & \cos\delta_y \end{pmatrix} \begin{pmatrix} \cos\delta_z & \sin\delta_z & 0 \\ -\sin\delta_z & \cos\delta_z & 0 \\ 0 & 0 & 1 \end{pmatrix}$$
"

and substitute --
$$D_A = D_B = \begin{pmatrix} 1 & 0 & 0 \\ 0 & \cos\delta_x & \cos\delta_x \\ 0 & -\cos\delta_x & \cos\delta_x \end{pmatrix} \begin{pmatrix} \cos\delta_y & 0 & -\cos\delta_y \\ 0 & 1 & 0 \\ \sin\delta_y & 0 & \cos\delta_y \end{pmatrix} \begin{pmatrix} \cos\delta_z & \sin\delta_z & 0 \\ -\sin\delta_z & \cos\delta_z & 0 \\ 0 & 0 & 1 \end{pmatrix}$$
--

Line 57, delete the first "a" and substitute -- the -- therefor.

Column 7,
Line 57, add -- which -- between "about" and "the".

Column 8,
Lines 35 to 37, delete "
$$\vec{u} = \begin{pmatrix} \vec{w} \\ \vec{g} \end{pmatrix} = N * \vec{b} = \begin{pmatrix} N_{11} & N_{12} \\ N_{21} & N_{22} \end{pmatrix} \begin{pmatrix} \vec{f} \\ \vec{m} \end{pmatrix}$$
"

and substitute --
$$\vec{u} = \begin{pmatrix} \vec{w} \\ \vec{\gamma} \end{pmatrix} = N * \vec{b} = \begin{pmatrix} N_{11} & N_{12} \\ N_{21} & N_{22} \end{pmatrix} \begin{pmatrix} \vec{f} \\ \vec{m} \end{pmatrix}$$
-- therefor.

Lines 45 to 49, delete "$\vec{g} = N_{21}\vec{f} + N_{22}\vec{m}$"

and substitute -- $\vec{\gamma} = N_{21}\vec{f} + N_{22}\vec{m}$ -- therefor.

UNITED STATES PATENT AND TRADEMARK OFFICE
CERTIFICATE OF CORRECTION

PATENT NO. : 6,546,643 B2
DATED : April 15, 2003
INVENTOR(S) : Werner Lotze and Tobias Held It is certified that error appears in the above-identified patent and that said Letters Patent is hereby corrected as shown below:

<u>Column 9,</u>
Line 16, delete " $\vec{u} = \vec{w} + \vec{g} \times \vec{p}$ "

and substitute -- $\vec{u} = \vec{w} + \vec{r} \times \vec{p}$ -- therefor.

Line 30, delete " $\vec{f}$ " and substitute -- $\vec{m}$ -- therefor.

Lines 43 to 45, delete " $\vec{u} \approx \vec{g} \times \vec{p} = (N_{22}(\vec{f} \times \vec{s})) \times \vec{p}$ "

and substitute -- $\vec{u} \approx \vec{r} \times \vec{p} = (N_{22}(\vec{f} \times \vec{s})) \times \vec{p}$ -- therefor.

<u>Column 10,</u>
Line 67, delete "$(x_k, y_k, z_K)$" and substitute -- $(x_K, y_K, z_K)$ -- therefor.

<u>Column 11,</u>
Line 32, delete "$(x_k, y_k, z_K)$" and substitute -- $(x_K, y_K, z_K)$ -- therefor.

<u>Column 12,</u>
Line 33, delete "p1" and insert a paragraph break therefor.

<u>Column 13,</u>
Line 44, delete "has" and substitute -- having -- therefor.

Signed and Sealed this

Ninth Day of September, 2003

JAMES E. ROGAN
*Director of the United States Patent and Trademark Office*